US 11,113,922 B2

United States Patent
Meyer et al.

(10) Patent No.: US 11,113,922 B2
(45) Date of Patent: Sep. 7, 2021

(54) LOGGING, RECOVERY AND REPLAY OF WAGERING GAME INSTANCES

(71) Applicant: Aristocrat Technologies Australia Pty Limited, North Ryde (AU)

(72) Inventors: Donovan Meyer, Austin, TX (US); Grant Nossier, Austin, TX (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 62 days.

(21) Appl. No.: 16/575,266

(22) Filed: Sep. 18, 2019

(65) Prior Publication Data

US 2021/0082229 A1  Mar. 18, 2021

(51) Int. Cl.
| | | |
|---|---|---|
| *G07F 17/32* | (2006.01) | |
| *A63F 13/79* | (2014.01) | |
| *A63F 13/23* | (2014.01) | |

(52) U.S. Cl.
CPC .......... *G07F 17/3204* (2013.01); *A63F 13/23* (2014.09); *A63F 13/79* (2014.09); *G07F 17/3267* (2013.01)

(58) Field of Classification Search
CPC .. G07F 17/3204; G07F 17/3267; A63F 13/23; A63F 13/79
See application file for complete search history.

(56) References Cited

U.S. PATENT DOCUMENTS

| | | | | |
|---|---|---|---|---|
| 6,863,608 B1* | 3/2005 | LeMay | ................... | G07F 17/32 463/20 |
| 8,684,818 B2 | 4/2014 | Meyer | | |
| 2003/0069067 A1* | 4/2003 | Okada | ................. | G07F 17/3234 463/20 |
| 2004/0147314 A1* | 7/2004 | LeMay | ............... | G07F 17/3239 463/30 |
| 2005/0064926 A1 | 3/2005 | Walker | | |
| 2006/0160621 A1* | 7/2006 | Rowe | ..................... | G07F 17/32 463/42 |
| 2007/0191111 A1* | 8/2007 | Sylla | ................... | G07F 17/3237 463/43 |

(Continued)

OTHER PUBLICATIONS

Notice of Allowance dated Sep. 11, 2020 for U.S. Appl. No. 16/575,261 (pp. 1-9).

(Continued)

*Primary Examiner* — Corbett B Coburn
(74) *Attorney, Agent, or Firm* — Weaver Austin Villeneuve & Sampson LLP

(57) ABSTRACT

A gaming device may be configured for receiving, via a user interface, user input corresponding to a request for play of a gambling game and for determining whether the gambling game is a base game or a sub game. Upon determining that the gambling game is a sub game, the gaming device may be configured for controlling a display system to provide a sequence of images corresponding to an instance of the sub game, for determining sub game data and sub game metadata corresponding to the instance of the sub game, for adding a sub game trace to a game history data structure corresponding to the sub game data and the sub game metadata and for adding a game round index marker to the game history data structure corresponding to the instance of the sub game.

21 Claims, 13 Drawing Sheets

(56) References Cited

U.S. PATENT DOCUMENTS

| | | | |
|---|---|---|---|
| 2007/0207854 A1* | 9/2007 | Wolf | G06F 12/12 |
| | | | 463/29 |
| 2007/0259709 A1 | 11/2007 | Kelly | |
| 2008/0076546 A1* | 3/2008 | Moyle | G07F 17/32 |
| | | | 463/29 |
| 2008/0214300 A1 | 9/2008 | Williams | |
| 2010/0190554 A1 | 7/2010 | Gagner | |
| 2010/0234105 A1* | 9/2010 | Gagner | G07F 17/3267 |
| | | | 463/30 |
| 2013/0165211 A1* | 6/2013 | Graham | G07F 17/3227 |
| | | | 463/25 |
| 2013/0210512 A1 | 8/2013 | Meyer | |
| 2013/0344935 A1* | 12/2013 | Ryan | G07F 17/34 |
| | | | 463/20 |
| 2014/0038727 A1 | 2/2014 | Nelson | |
| 2015/0018076 A1 | 1/2015 | Montenegro | |
| 2017/0278349 A1* | 9/2017 | Takeda | G07F 17/3288 |

OTHER PUBLICATIONS

Corrected Notice of Allowance dated Sep. 23, 2020 for U.S. Appl. No. 16/575,261 (pp. 1-5).

* cited by examiner

FIG. 7

Operator Menu/Window — 705

ARISTOCRAT

Operator Menu/Window

Game History / Administrator Operator Menu    14:30:04 :: 5/31/20XX

Game History

| # | NO. | GAME/EVENT | START TIME | END TIME | CASH IN | CASH OUT | START CASH | CASH WAGERED | CASH WON | END CASH | STATUS 720 |
|---|---|---|---|---|---|---|---|---|---|---|---|
| 3 | 11/11 | Buffalo | 5/31/20XX 14:29:38 | 5/31/20XX 14:29:47 | | | $136.50 | $0.00 | $0.00 | $136.50 | Complete |
| 3 | 10/11 | Buffalo | 5/31/20XX 14:29:33 | 5/31/20XX 14:29:38 | | | $136.30 | $0.00 | $0.20 | $136.50 | Complete |
| 3 | 9/11 | Buffalo | 5/31/20XX 14:29:22 | 5/31/20XX 14:29:32 | | | $133.50 | $0.00 | $2.80 | $136.30 | Complete |
| 3 | 8/11 | Buffalo | 5/31/20XX 14:29:02 | 5/31/20XX 14:29:22 | | | $22.80 | $0.00 | $110.70 | $133.50 | Complete |
| 3 | 7/11 | Buffalo | 5/31/20XX 14:28:57 | 5/31/20XX 14:29:02 | | | $22.80 | $0.00 | $0.00 | $22.80 | Complete |
| 3 | 6/11 | Buffalo | 5/31/20XX 14:28:52 | 5/31/20XX 14:28:57 | | | $21.10 | $0.00 | $1.70 | $22.80 | Complete |
| 3 | 5/11 | Buffalo | 5/31/20XX 14:28:44 | 5/31/20XX 14:28:52 | | | $19.60 | $0.00 | $1.50 | $21.10 | Complete |
| 3 | 4/11 | Buffalo | 5/31/20XX 14:28:36 | 5/31/20XX 14:28:43 | | | $19.20 | $0.40 | $0.80 | $19.60 | Complete |
| 3 | 3/11 | Buffalo | 5/31/20XX 14:28:20 | 5/31/20XX 14:28:36 | | | $19.60 | $0.40 | $0.00 | $19.20 | Complete |
| 2 | 2/11 | Buffalo | 5/31/20XX 14:27:46 | 5/31/20XX 14:27:51 | | | $20.00 | $0.40 | $0.00 | $19.60 | Complete |
| 1 | 1/11 | Buffalo | 5/31/20XX 14:27:41 | 5/31/20XX 14:27:45 | | | $0.00 | $0.00 | $0.00 | $20.00 | Complete |
| | | Bill In | 5/31/20XX 14:27:37 | | $20.00 | | | | | | |

General Settings
Status
Hardware
Meters
Logs
Error/Tilt
Sound
Game History — 710
Game Info
Comms
Time and Date
Network
Options
Software 725 — [ Replay ] [ Print Selected Record ] [ Print Last 15 Records ] [ Print Current Page ]

Cash Balance: $136.50

FIG. 9

```
                                    1010
                                     |           Blob Bin Hex Decode.txt              1005
?Offset(h)  00 01 02 03 04 05  06 07 08 09 0A 0B 0C 0D 0E 0F 00000000    10 00 54 52 45 6E  67 69 6E 65 00 04 00 02 00 01   ..TREngine......
00000010    00 10 00 42 75 66  66 61 6C 6F 00 04 00 D4 5E C6   ...Buffalo...Ô^Æ
00000020    96 10 00 2F 47 61  6D 65 43 6F 6E 66 69 67 75 72   –../GameConfigur
00000030    61 74 69 6F 6E 2F  4C 61 6E 67 75 61 67 65 73 2F   ation/Languages/
00000040    41 63 74 69 76 65  00 10 00 65 6E 2D 75 73 00 04   Active...en-us..
00000050    00 00 00 00 00 04  00 C1 D2 A9 4F 10 00 2F 47 61   .......ÁÒ©O../Ga
00000060    6D 65 43 6F 6E 66  69 67 75 72 61 74 69 6F 6E 2F   meConfiguration/
00000070    52 65 70 6C 61 79  53 74 61 74 65 5B 40 67 61 6D   ReplayState[@gam
00000080    65 57 72 69 74 61  62 6C 65 3D 27 74 72 75 65 27   eWritable='true'
00000090    20 40 73 65 72 76  65 72 4F 6E 6C 79 3D 27 66 61    @serverOnly='fa
000000A0    6C 73 65 27 5D 2F  42 65 74 49 6E 64 65 78 00 10   lse']/BetIndex..
000000B0    00 30 00 04 00 C1  D2 A9 4F 10 00 2F 47 61 6D 65   .0...ÁÒ©O../Game
000000C0    43 6F 6E 66 69 67  75 72 61 74 69 6F 6E 2F 52 65   Configuration/Re
000000D0    70 6C 61 79 53 74  61 74 65 5B 40 67 61 6D 65 57   playState[@gameW
000000E0    72 69 74 61 62 6C  65 3D 27 74 72 75 65 27 20 40   ritable='true' @
000000F0    73 65 72 76 65 72  4F 6E 6C 79 3D 27 66 61 6C 73   serverOnly='fals
00000100    65 27 5D 2F 4C 69  6E 65 49 6E 64 65 78 00 10 00   e']/LineIndex...
00000110    30 00 04 00 C1 D2  A9 4F 10 00 2F 47 61 6D 65 43   0...ÁÒ©O../GameC
00000120    6F 6E 66 69 67 75  72 61 74 69 6F 6E 2F 52 65 70   onfiguration/Rep
00000130    6C 61 79 53 74 61  74 65 5B 40 67 61 6D 65 57 72   layState[@gamewr
00000140    69 74 61 62 6C 65  3D 27 74 72 75 65 27 20 40 73   itable='true' @s
00000150    65 72 76 65 72 4F  6E 6C 79 3D 27 66 61 6C 73 65   erverOnly='false
00000160    27 5D 2F 46 69 72  73 74 47 61 6D 65 00 10 00 66   ']/FirstGame...f
00000170    61 6C 73 65 00 04  00 C1 D2 A9 4F 10 00 2F 47 61   alse...ÁÒ©O../Ga
00000180    6D 65 43 6F 6E 66  69 67 75 72 61 74 69 6F 6E 2F   meConfiguration/
00000190    52 65 70 6C 61 79  53 74 61 74 65 5B 40 67 61 6D   ReplayState[@gam
000001A0    65 57 72 69 74 61  62 6C 65 3D 27 74 72 75 65 27   eWritable='true'
000001B0    20 40 73 65 72 76  65 72 4F 6E 6C 79 3D 27 66 61    @serverOnly='fa
000001C0    6C 73 65 27 5D 2F  52 65 65 6C 53 74 6F 70 73 00   lse']/ReelStops.
000001D0    10 00 36 37 2C 20  32 38 2C 20 34 2C 20 35 2C 20   ..67, 28, 4, 5,
000001E0    32 38 00 04 00 C1  D2 A9 4F 10 00 2F 47 61 6D 65   28...ÁÒ©O../Game
000001F0    43 6F 6E 66 69 67  75 72 61 74 69 6F 6E 2F 52 65   Configuration/Re
00000200    70 6C 61 79 53 74  61 74 65 5B 40 67 61 6D 65 57   playState[@gameW
00000210    72 69 74 61 62 6C  65 3D 27 74 72 75 65 27 20 40   ritable='true' @
00000220    73 65 72 76 65 72  4F 6E 6C 79 3D 27 66 61 6C 73   serverOnly='fals
00000230    65 27 5D 2F 49 6E  52 65 70 6C 61 79 00 10 00 74   e']/InReplay...t
00000240    72 75 65 00 04 00  26 85 2B 49 10 00 47 44 4B 5F   rue...&.+I..GDK_
00000250    42 6F 6F 73 74 65  72 47 61 6D 65 00 04 00 14 00   BoosterGame.....
00000260    00 00 00 02 04 00  14 00 00 00 01 00 00 00 08 00   ................
00000270    00 00 08 00 00 00  00 00 00 00 00 00 00 04 00 00   ................
00000280    D8 56 DA 18 08 00  80 07 00 00 00 00 00 00 08 00   ØVÚ...€.........
00000290    28 00 00 00 00 00  00 00 04 00 00 00 00 00 04 00   (...............
000002A0    6E 3D B0 3D 04 00  0D 00 00 00 04 00 00 00 00 00   n=°=............
000002B0    10 00 53 70 69 6E  00 10 00 00 10 00 53 70 69 6E   ..Spin......Spin
000002C0    53 74 61 74 65 00  04 00 CC 1D DD 9F 04 00 00 00   State...Ì.Ýŷ....
000002D0    00 00 10 00 42 61  73 65 47 61 6D 65 53 70 69 6E   ....BaseGameSpin
000002E0    00 04 00 00 00 00  00 04 00 06 00 00 00 04 00 1C   ................
000002F0    00 00 00 04 00 17  00 00 00 04 00 13 00 00 00 04   ................
00000300    00 04 00 00 00 04  00 07 00 00 00 04 00 7A 00 00   .............z..
00000310    00 08 00 28 00 00  00 00 00 00 00 08 00 80 07 00   ...(.........€..
00000320    00 00 00 00 00 00  08 00 58 07 00 00 00 00 00 08   ........X.......
00000330    00 00 00 00 00 00  00 00 08 00 28 00 00 00 00 00   ..........(.....
00000340    00 00 00 08 00 00  00 00 00 00 00 08 00 00 00 00   ................
00000350    00 00 00 00 00 00  00 08 00 00 00 00 00 00 00 00   ................
00000360    00 08 00 00 00 00  00 00 00 00 08 00 01 00 00 00   ................
00000370    00 00 00 00 00 00  00 04 00 6E 3D B0 3D 04 00 00   .........n=°=...
00000380    0D 00 00 00 04 00  00 00 00 10 00 46 72 65 65 00   ...........Free.
00000390    53 70 69 6E 30 00  10 00 00 10 00 46 72 65 65 53   Spin0......FreeS
000003A0    70 69 6E 53 74 61  74 65 00 04 00 87 09 DB 84 04   pinState...‡.Û„.
000003B0    00 CC 1D DD 9F 04  00 01 00 00 00 10 00 46 72 65   .Ì.Ýŷ........Fre
000003C0    65 47 61 6D 65 53  70 69 6E 00 04 00 00 00 00 00   eGameSpin.......
```

FIG. 10A

1010
                        ┌────────┴────────┐
                                                              1005
                                                          ┌────┴────┐
                          Blob Bin Hex Decode.txt
000003D0  04 00 07 00 00 00 04 00 43 00 00 00 04 00 20 00   ........C..... .
000003E0  00 00 04 00 58 00 00 00 04 00 3F 00 00 00 04 00   ....X.....?.....
000003F0  45 00 00 00 04 00 56 00 00 00 04 00 AF 03 00 00   E.....V.........
00000400  08 00 28 00 00 00 00 00 00 00 08 00 80 07 00 00   ..(.............
00000410  00 00 00 00 08 00 58 07 00 00 00 00 00 00 08 00   ......X.........
00000420  00 00 00 00 00 00 00 00 08 00 28 00 00 00 00 00   ..........(.....
00000430  00 00 08 00 50 00 00 00 00 00 00 00 08 00 00 00   ....P...........
00000440  00 00 00 00 00 00 08 00 00 00 00 00 00 00 00 00   ................
00000450  08 00 00 00 00 00 00 00 00 00 08 00 01 00 00 00   ................
00000460  00 00 00 00 00 00 00 00 04 00 6E 3D B0 3D 04 00 0D   .........n=°=...
00000470  00 00 04 00 00 00 00 00 10 00 46 72 65 65 53   ..........FreeS
00000480  70 69 6E 31 00 10 00 00 00 10 00 46 72 65 65 53 70   pin1.......FreeSp
00000490  69 6E 53 74 61 74 65 00 04 00 [B7 09 DB 84] 04 00   inState......Û„..
000004A0  CC 1D DD 9F 04 00 02 00 00 00 10 00 46 72 65 65   Ì.Ýÿ........Free
000004B0  47 61 6D 65 53 70 69 6E 00 04 00 00 00 00 00 04   GameSpin........
000004C0  00 07 00 00 00 04 00 16 00 00 00 04 00 14 00 00   ................
000004D0  00 04 00 51 00 00 00 04 00 2C 00 00 00 04 00 1D   ...Q.....,......
000004E0  00 00 00 04 00 2F 00 00 00 04 00 88 03 00 00 08   ...../..........
000004F0  00 28 00 00 00 00 00 00 00 08 00 80 07 00 00 00   .(..............
00000500  00 00 00 08 00 58 07 00 00 00 00 00 00 00 08 00   .....X..........
00000510  00 00 00 00 00 00 00 00 08 00 28 00 00 00 00 00   ..........(.....
00000520  00 08 00 E6 00 00 00 00 00 00 08 00 00 00 00 00   ...æ............
00000530  00 00 00 00 00 00 08 00 00 00 00 00 00 00 00 08   ................
00000540  00 00 00 00 00 00 00 00 08 00 01 00 00 00 00 00   ................
00000550  00 00 00 00 00 00 04 00 6E 3D B0 3D 04 00 0D 00   ........n=°=....
00000560  00 00 04 00 00 00 00 00 10 00 46 72 65 65 53 70   ..........FreeSp
00000570  69 6E 32 00 10 00 00 00 10 00 46 72 65 65 53 70 69   in2.......FreeSpi
00000580  6E 53 74 61 74 65 00 04 00 [B7 09 DB 84] 04 00 CC   nState.....Û„..Ì
00000590  1D DD 9F 04 00 03 00 00 00 10 00 46 72 65 65 47   .Ýÿ........FreeG
000005A0  61 6D 65 53 70 69 6E 00 04 00 00 00 00 00 04 00   ameSpin.........
000005B0  06 00 00 00 04 00 3F 00 00 00 04 00 45 00 00 00   ......?.....E...
000005C0  04 00 3E 00 00 00 04 00 09 00 00 00 04 00 4A 00   ..>...........J.
000005D0  00 00 04 00 C2 02 00 00 08 00 28 00 00 00 00 00   ....Â.....(.....
000005E0  00 00 08 00 80 07 00 00 00 00 00 00 08 00 58 07   ..............X.
000005F0  00 00 00 00 00 00 08 00 00 00 00 00 00 00 00 00   ................
00000600  08 00 28 00 00 00 00 00 00 00 08 00 90 01 00 00   ..(.............
00000610  00 00 00 00 08 00 00 00 00 00 00 00 08 00 00 00   ................
00000620  00 00 00 00 00 00 08 00 00 00 00 00 00 00 00 00   ................
00000630  00 00 08 00 01 00 00 00 00 00 00 00 00 00 00 04   ................
00000640  00 6E 3D B0 3D 04 00 0D 00 00 00 04 00 00 00 00 00   .n=°=...........
00000650  00 10 00 46 72 65 65 53 70 69 6E 33 00 10 00 00   ...FreeSpin3....
00000660  10 00 [46 72 65 65] 53 70 69 6E 53 74 61 74 65 00   ..FreeSpinState.
00000670  04 00 [B7 09 DB 84] 04 00 CC 1D DD 9F 04 00 04 00   ...Û„..Ì.Ýÿ.....
00000680  00 00 10 00 46 72 65 65 47 61 6D 65 53 70 69 6E   ....FreeGameSpin
00000690  00 04 00 00 00 00 00 04 00 06 00 00 00 04 00 26   ...............&
000006A0  00 00 00 04 00 10 00 00 00 04 00 28 00 00 00 04   ...........(....
000006B0  00 29 00 00 00 04 00 40 00 00 00 04 00 3A 00 00   .)....@......:..
000006C0  00 08 00 28 00 00 00 00 00 00 00 08 00 80 07 00   ...(............
000006D0  00 00 00 00 00 08 00 58 07 00 00 00 00 00 00 08   .......X........
000006E0  00 00 00 00 00 00 00 00 08 00 28 00 00 00 00 00   ..........(.....
000006F0  00 00 08 00 90 01 00 00 00 00 00 00 08 00 00 00   ................
00000700  00 00 00 00 08 00 00 00 00 00 00 00 00 00 00 00   ................
00000710  00 08 00 00 00 00 00 00 00 08 00 01 00 00 00 00   ................
00000720  00 00 00 00 00 00 00 04 00 6E 3D B0 3D 04 00   .........n=°=..
00000730  0D 00 00 00 04 00 00 00 00 00 10 00 46 72 65 65   ............Free
00000740  53 70 69 6E 34 00 10 00 00 00 10 00 46 72 65 65 53   Spin4.......FreeS
00000750  70 69 6E 53 74 61 74 65 00 04 00 [B7 09 DB 84] 04   pinState.....Û„.
00000760  00 CC 1D DD 9F 04 00 05 00 00 00 10 00 46 72 65   .Ì.Ýÿ........Fre
00000770  65 47 61 6D 65 53 70 69 6E 00 04 00 00 00 00 00   eGameSpin.......
00000780  04 00 09 00 00 00 04 00 0C 00 00 00 04 00 20 00   .............. .
00000790  00 00 04 00 39 00 00 00 04 00 42 00 00 00 04 00   ....9.....B.....
000007A0  51 00 00 00 04 00 63 00 00 00 04 00 59 00 00 00   Q.....c.....Y...
000007B0  04 00 39 00 00 00 04 00 9D 02 00 00 08 00 28 00   ..9...........(.
```

FIG. 10B

```
                           1010                                      1005
                ┌───────────┴───────────┐                         ┌────┴────┐
                          Blob Bin Hex Decode.txt
000007C0   00 00 00 00 00 00 08 00 80 07 00 00 00 00 00 00   ........€.......
000007D0   08 00 58 07 00 00 00 00 00 00 08 00 00 00 00 00   ..X.............
000007E0   00 00 00 00 08 00 28 00 00 00 00 00 00 00 08 00   ......(.........
000007F0   90 01 00 00 00 00 00 00 08 00 00 00 00 00 00 00   ................
00000800   00 00 08 00 00 00 00 00 00 00 00 00 08 00 00 00   ................
00000810   00 00 00 00 00 00 08 00 01 00 00 00 00 00 00 00   ................
00000820   00 00 00 04 00 6E 3D B0 3D 04 00 0D 00 00 00 04   .....n=°=.......
00000830   00 00 00 00 00 10 00 46 72 65 65 53 70 69 6E 35   .......FreeSpin5
00000840   00 10 00 00 10 00 46 72 65 65 53 70 69 6E 53 74   ......FreeSpinSt
00000850   61 74 65 00 04 00 B7 09 DB 84 04 00 CC 1D DD 9F   ate...·.Û„..Ì.Ýß
00000860   04 00 06 00 00 00 10 00 46 72 65 65 47 61 6D 65   ........FreeGame
00000870   53 70 69 6E 00 04 00 00 00 00 04 00 08 00 00 00   Spin............
00000880   00 04 00 49 00 00 00 04 00 3D 00 00 00 04 00 1F   ...I.....=......
00000890   00 00 00 04 00 03 00 00 00 04 00 21 00 00 00 04   ...........!....
000008A0   00 2C 00 00 00 04 00 2E 00 00 00 04 00 7D 03 00   .,...........}..
000008B0   00 08 00 28 00 00 00 00 00 00 00 08 00 80 07 00   ...(..........€..
000008C0   00 00 00 00 00 08 00 58 07 00 00 00 00 00 00 08   .......X........
000008D0   00 00 00 00 00 00 00 08 00 28 00 00 00 00 00 00   .........(......
000008E0   00 00 00 08 00 CE 2C 00 00 00 00 00 00 08 00 00   .....Î,.........
000008F0   00 00 00 00 00 08 00 00 00 00 00 00 00 00 00 00   ................
00000900   00 08 00 00 00 00 00 00 00 00 08 00 01 00 00 00   ................
00000910   00 00 00 00 00 00 00 04 00 6E 3D B0 3D 04 00 00   .........n=°=...
00000920   0D 00 00 00 04 00 00 00 00 00 10 00 46 72 65 65   ............Free
00000930   53 70 69 6E 36 00 10 00 00 10 00 46 72 65 65 53   Spin6......FreeS
00000940   70 69 6E 53 74 61 74 65 00 04 00 B7 09 DB 84 04   pinState...·.Û„.
00000950   00 CC 1D DD 9F 04 00 07 00 00 00 10 00 46 72 65   .Ì.Ýß........Fre
00000960   65 47 61 6D 65 53 70 69 6E 00 04 00 00 00 00 00   eGameSpin.......
00000970   04 00 06 00 00 00 04 00 19 00 00 00 04 00 14 00   ................
00000980   00 00 04 00 17 00 00 00 04 00 09 00 00 00 04 00   ................
00000990   12 00 00 00 04 00 B6 02 00 00 08 00 28 00 00 00   ......¶.....(...
000009A0   00 00 00 00 08 00 80 07 00 00 00 00 00 00 08 00   ......€.........
000009B0   58 07 00 00 00 00 00 00 08 00 00 00 00 00 00 00   X...............
000009C0   00 00 08 00 28 00 00 00 00 00 00 00 08 00 E6 2D   ....(.........æ-
000009D0   00 00 00 00 00 00 00 08 00 00 00 00 00 00 00 00   ................
000009E0   08 00 00 00 00 00 00 00 00 08 00 00 00 00 00 00   ................
000009F0   00 00 00 00 08 00 01 00 00 00 00 00 00 00 00 00   ................
00000A00   00 04 00 6E 3D B0 3D 04 00 0D 00 00 00 04 00 00   ...n=°=.........
00000A10   00 00 00 10 00 46 72 65 65 53 70 69 6E 37 00 10   .....FreeSpin7..
00000A20   00 00 10 00 46 72 65 65 53 70 69 6E 53 74 61 74   ....FreeSpinStat
00000A30   65 00 04 00 B7 09 DB 84 04 00 CC 1D DD 9F 04 00   e...·.Û„..Ì.Ýß..
00000A40   08 00 00 00 10 00 46 72 65 65 47 61 6D 65 53 70   ......FreeGameSp
00000A50   69 6E 00 04 00 00 00 00 00 04 00 06 00 00 00 04   in..............
00000A60   00 1E 00 00 00 04 00 45 00 00 80 04 00 17 00 00   .......E...€....
00000A70   00 04 00 07 00 00 00 04 00 1A 00 00 00 04 00 79   ...............y
00000A80   02 00 00 08 00 28 00 00 00 00 00 00 00 08 00 80   .....(........€
00000A90   07 00 00 00 00 00 00 08 00 58 07 00 00 00 00 00   .........X......
00000AA0   00 08 00 00 00 00 00 00 00 00 08 00 28 00 00 00   ............(...
00000AB0   00 00 00 00 00 08 00 FA 2D 00 00 00 00 00 00 08   .......ú-.......
00000AC0   00 00 00 00 00 00 00 00 08 00 00 00 00 00 00 00   ................
00000AD0   00 00 00 08 00 00 00 00 00 00 00 00 00 08 00 01   ................
00000AE0   00 00 00 00 00 00 00 00 00 00                     ..........
```

FIG. 10C

LOGGING, RECOVERY AND REPLAY OF WAGERING GAME INSTANCES

CROSS-REFERENCE TO RELATED APPLICATION

This application is related to U.S. patent application Ser. No. 16/575,261 (entitled "LOGGING, RECOVERY AND REPLAY OF WAGERING GAME INSTANCES," which is being filed on the same day as the present application and which is hereby incorporated by reference.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

At least some aspects of the present disclosure may be implemented via apparatus. For example, one or more devices may be configured for performing, at least in part, the methods disclosed herein. In some implementations, the apparatus may be a gaming device. The gaming device may include a display system that includes one or more displays, an interface system including one or more user interfaces and a control system that includes one or more processors.

The interface system may include one or more network interfaces, one or more interfaces between the control system and a memory system, one or more interfaces between the control system and another device, one or more external device interfaces and/or one or more user interfaces. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. Accordingly, in some implementations the control system may include one or more processors and one or more non-transitory storage media operatively coupled to the one or more processors.

The control system may, for example, be configured for receiving, via the user interface, user input corresponding to a request for replay of a gambling game. The request may include a game round indication pertaining to an individual free game from within a feature game that may include a plurality of free games. The control system may be configured for querying a game history data structure. The control system may be configured for retrieving game round metadata corresponding to the individual free game. The control system may be configured for controlling a display to provide a sequence of images corresponding to the game round metadata.

In some examples, the game round indication may include a base game indication and a feature game indication. According to some implementations, the sequence of images may correspond to a replay of the individual free game. In some instances, the game history data structure may include game round metadata and game round index markers. The game round index markers may include free game index markers for individual free games of the plurality of free games. Querying the game history data structure may involve searching for a free game index marker corresponding to the individual free game.

According to some implementations, the gaming device may be an electronic gaming machine or a mobile gaming device configured for deployment in a casino. In some such implementations, the gaming device may be a video lottery terminal (VLT). However, in some examples the gaming device may be an end user device that may be configured for online gaming. In some instances, the apparatus is not a gaming device.

In some implementations, the apparatus may include the display that provides the sequence of images corresponding to the game round metadata. However, in some instances the apparatus may control another device that includes the display that provides the sequence of images corresponding to the game round metadata. For example, in some instances an end user device may control a display of another device, such as a display of a gaming device, to provide the sequence of images corresponding to the game round metadata.

At least some aspects of the present disclosure may be implemented via methods. For example, a method may involve receiving user input corresponding to a request for replay of a gambling game. The user input may, for example, be received by a control system via a user interface. The request may include a game round indication pertaining to an individual free game from within a feature game that includes a plurality of free games. The method may involve querying (e.g., by the control system) a game history data structure. The method may involve retrieving (e.g., by the control system) game round metadata corresponding to the individual free game. The method may involve controlling (e.g., by the control system) a display to provide a sequence of images corresponding to the game round metadata.

In some examples, the game round indication may include a base game indication and a feature game indication. In some instances, the sequence of images may correspond to a replay of the individual free game.

According to some implementations, the game history data structure may include game round metadata and game round index markers. The game round index markers may, for example, include free game index markers for individual free games of the plurality of free games. Querying the game history data structure may involve searching for a free game index marker corresponding to the individual free game.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, various innovative aspects of the subject matter described in this disclosure can be implemented in one or more non-transitory media having software stored thereon. The software may, for example, be executable by one or more components of a control system such as those disclosed herein. The software may, for example, include instructions for performing one or more of the methods disclosed herein.

Additional aspects of the present disclosure may be implemented via apparatus. For example, one or more devices may be may be configured for performing, at least in part, the methods disclosed herein. In some implementations, the apparatus may be a gaming device. The gaming device may include a display system that includes one or more display devices, an interface system including one or more user interfaces, a memory system and a control system that includes one or more processors. The memory system may be configured for storing a game history data structure. The control system may be configured for receiving, via the user interface, user input corresponding to a request for play of a gambling game and for determining whether the gambling game is a base game or a sub game.

Upon determining that the gambling game is a base game, the control system may be configured for controlling the display system to provide a sequence of images corresponding to an instance of the base game, for determining base game data and base game metadata corresponding to the instance of the base game and for adding a base game trace to the game history data structure corresponding to the base game data and the base game metadata.

Upon determining that the gambling game is a sub game, the control system may be configured for controlling the display system to provide a sequence of images corresponding to an instance of the sub game, for determining sub game data and sub game metadata corresponding to the instance of the sub game, for adding a sub game trace to the game history data structure corresponding to the sub game data and the sub game metadata, and for adding a game round index marker to the game history data structure corresponding to the instance of the sub game. According to some examples, the game round index marker may include a render state field indicating that a game instance should render to a display.

In some examples, the sub game may be a feature game. In some such examples, the feature game may be a free game. According to some such examples, the game round index marker may be an index to a particular free game instance.

According to some implementations, the base game data and the base game metadata may include sufficient information to provide a replay of the instance of the base game. In some such implementations, the sub game data and the sub game metadata may include sufficient information to provide a replay of the instance of the sub game. In some instances, the base game metadata may include RNG data, starting credits data, credits wagered data, credits won data, ending credits data, slot symbol data and/or other game outcome presentation data.

Additional methods disclosed herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, various innovative aspects of the subject matter described in this disclosure can be implemented in one or more non-transitory media having software stored thereon. The software may, for example, be executable by one or more components of a control system such as those disclosed herein.

The software may, for example, include instructions for performing a method of recording gambling game events for replay. The method may involve receiving, via a user interface, user input corresponding to a request for play of a gambling game and determining, via a control system that includes at least one processor, whether the gambling game is a base game or a sub game.

Upon determining that the gambling game is a base game, the method may involve controlling, via the control system, the display system to provide a sequence of images corresponding to an instance of the base game, determining, via the control system, base game data and base game metadata corresponding to the instance of the base game and adding, via the control system, a base game trace to a game history data structure corresponding to the base game data and the base game metadata.

Upon determining that the gambling game is a sub game, the method may involve controlling, via the control system, the display system to provide a sequence of images corresponding to an instance of the sub game, determining, via the control system, sub game data and sub game metadata corresponding to the instance of the sub game, adding, via the control system, a sub game trace to the game history data structure corresponding to the sub game data and the sub game metadata, and adding, via the control system, a game round index marker to the game history data structure corresponding to the instance of the sub game. According to some examples, the game round index marker may include a render state field indicating that a game instance should render to a display.

In some examples, the sub game may be a feature game. In some such examples, the feature game may be a free game. According to some such examples, the game round index marker may be an index to a particular free game instance.

According to some implementations, the base game data and the base game metadata may include sufficient information to provide a replay of the instance of the base game. In some such implementations, the sub game data and the sub game metadata may include sufficient information to provide a replay of the instance of the sub game. In some instances, the base game metadata may include RNG data, starting credits data, credits wagered data, credits won data, ending credits data, slot symbol data and/or other game outcome presentation data.

Additional aspects of the present disclosure may be implemented via a method of recording gambling game events for replay. The method may involve receiving, via a user interface, user input corresponding to a request for play of a gambling game and determining, via a control system that includes at least one processor, whether the gambling game is a base game or a sub game.

Upon determining that the gambling game is a base game, the method may involve controlling, via the control system, the display system to provide a sequence of images corresponding to an instance of the base game, determining, via the control system, base game data and base game metadata corresponding to the instance of the base game and adding, via the control system, a base game trace to a game history data structure corresponding to the base game data and the base game metadata.

Upon determining that the gambling game is a sub game, the method may involve controlling, via the control system, the display system to provide a sequence of images corresponding to an instance of the sub game, determining, via the control system, sub game data and sub game metadata corresponding to the instance of the sub game, adding, via the control system, a sub game trace to the game history data structure corresponding to the sub game data and the sub game metadata, and adding, via the control system, a game round index marker to the game history data structure corresponding to the instance of the sub game. According to some examples, the game round index marker may include a render state field indicating that a game instance should render to a display.

In some examples, the sub game may be a feature game. In some such examples, the feature game may be a free game. According to some such examples, the game round index marker may be an index to a particular free game instance.

According to some implementations, the base game data and the base game metadata may include sufficient information to provide a replay of the instance of the base game. In some such implementations, the sub game data and the sub game metadata may include sufficient information to provide a replay of the instance of the sub game. In some instances, the base game metadata may include RNG data, starting credits data, credits wagered data, credits won data, ending credits data, slot symbol data and/or other game outcome presentation data.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings generally indicate like elements.

BRIEF DESCRIPTION OF THE DRAWINGS

FIG. 7 shows an example of a graphical user interface (GUI) that may be used to access game history.

FIG. 9 shows an example of a game history data structure.

FIGS. 10A, 10B and 10C show an example of a decoded version of the game history data structure shown in FIG. 9.

DETAILED DESCRIPTION

Figure 1:
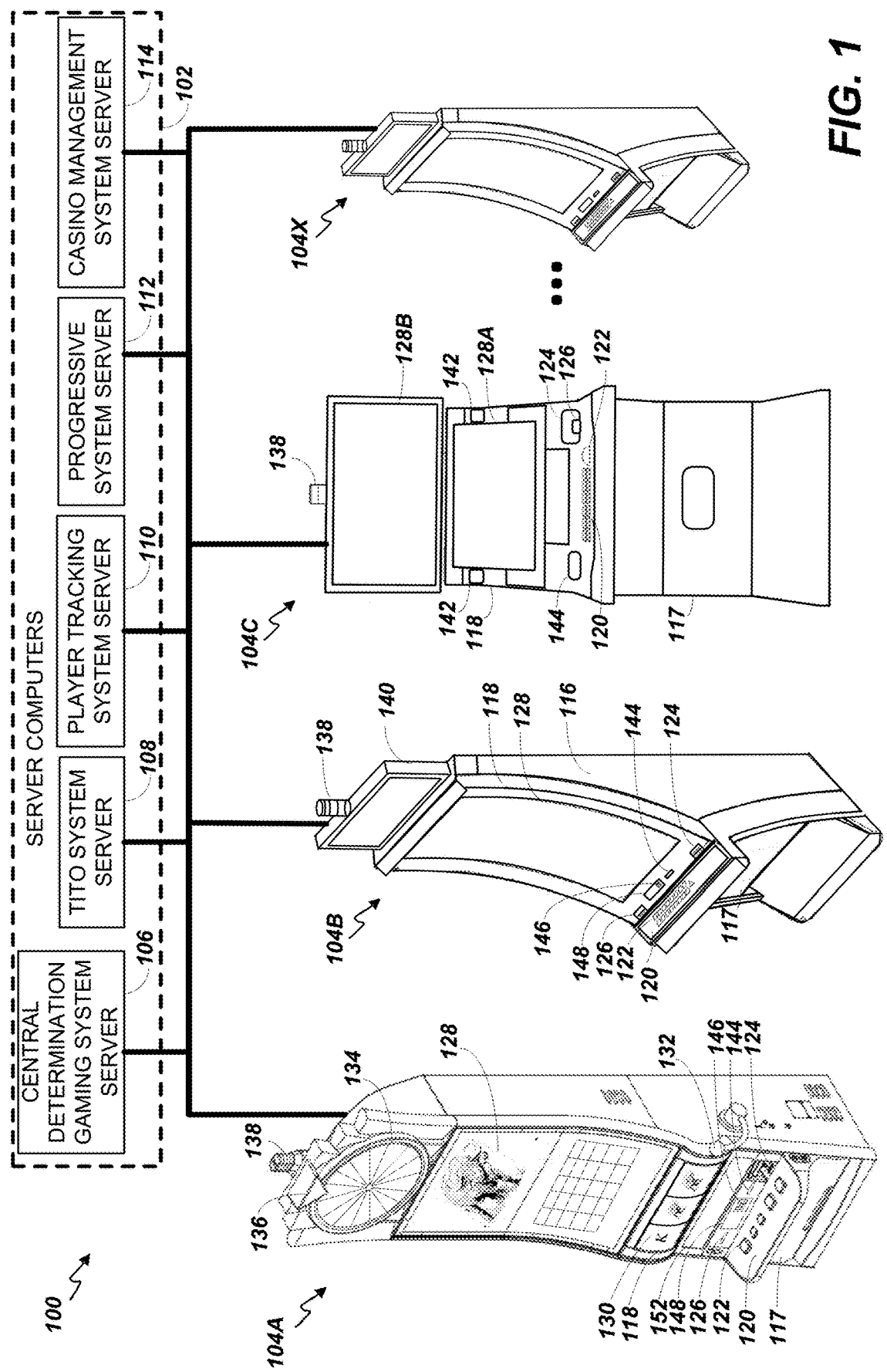
FIG. 1 is a diagram showing examples of several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices. Some examples are described below.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

Moreover, in some implementations at least some of the EGMs may be "thin-client" or "thick-client" EGMs that are not configured for stand-alone determination of game outcomes, etc. Such client EGMs may be configured for communication with one or more of the different server computers 102 described herein, including but not limited to the central determination gaming system server 106. Some such client EGMs may, for example, be configured to accept tickets and/or cash (e.g., via a bill validator that also functions as a ticket reader) to load credits onto the client EGM, a "ticket-out" printer for outputting a credit ticket when a cash out button is pressed, a player tracking card reader, etc. Some client EGMs may include a transceiver for wireless communication with a player's mobile device, (e.g., for communication with a player's smartphone, tablet and/or mobile gaming device) a keypad 146, and/or an illuminated display 148 for reading, receiving, entering, and/or displaying player tracking information. A client EGM may include a display system, an audio system, etc., for presenting attract sequences, game presentations, etc. The game presentations may include game outcomes determined by another device, such as the central determination gaming system server 106.

The server computers 102 may include a central determination gaming system server 106, a Class II bingo server (not shown), a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 117 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to present or determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor. The main display 128 may be a touchscreen display.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
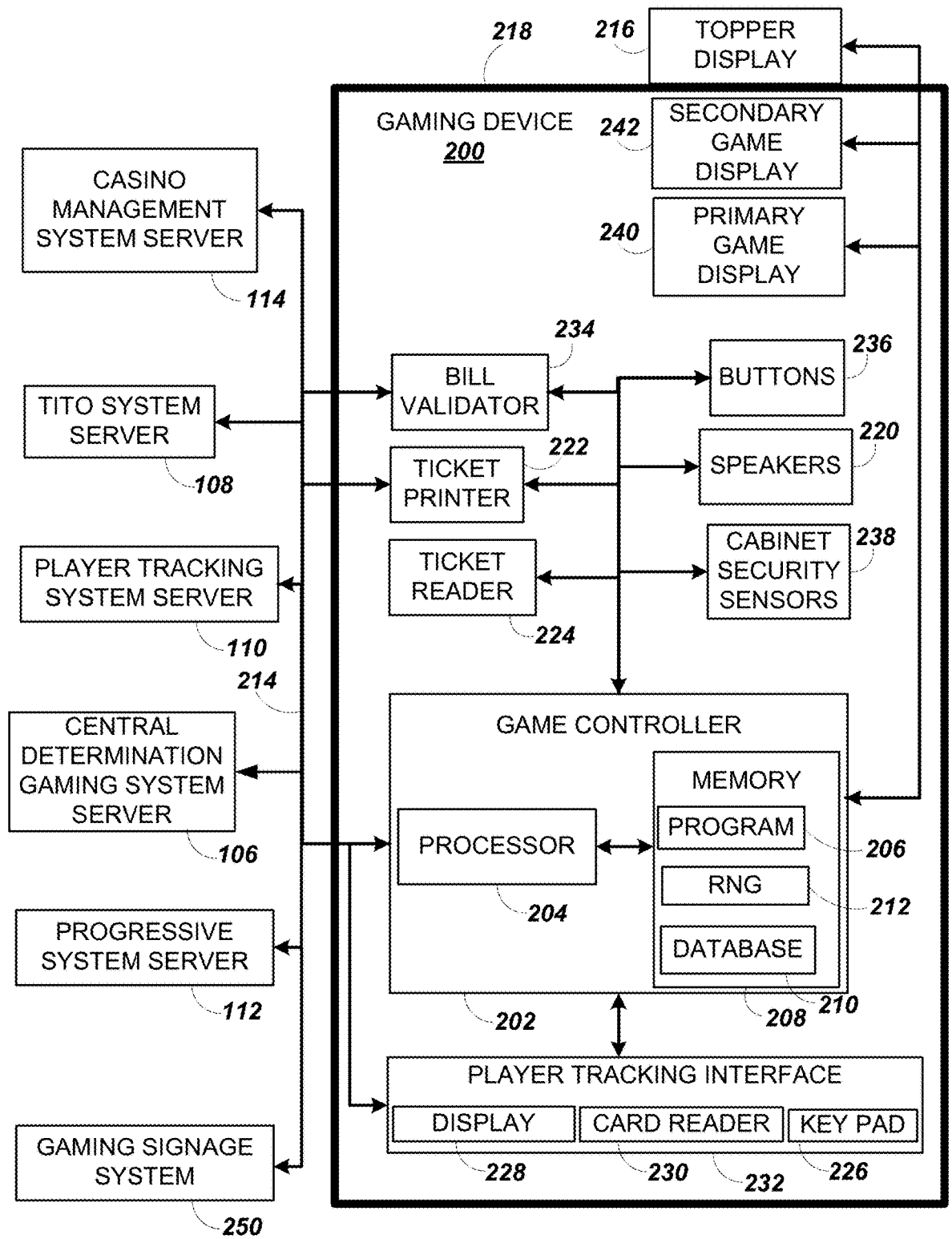
FIG. 2 is a block diagram showing examples of various functional elements of an EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 117 which opens to provide access to the interior of the gaming device 104B. The main or service door 117 is typically used by service personnel to refill the ticket-out printer 126 and collect bills and tickets inserted into the bill validator 124. The door 117 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class II or Class III, etc.

FIG. 2 is a block diagram depicting examples of internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as the central determination gaming system server 106. The game instance may be communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), and a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

In this example, the gaming device 200 is also configured for communication with a gaming signage system 250 via the network 214. Various examples of gaming signage systems 250 are provided herein. According to some examples, the gaming signage system 250 may be configured for communication with other elements of a gaming system via the network 214, such as the central determination gaming system server 106, the progressive system server 112, the player tracking system server 110 the casino management system server 114 and/or the TITO system server 108.

When the player is done, he/she cashes out the credit balance (typically by pressing a cash out button to receive a ticket from the ticket printer 222). The ticket may be redeemed for money or inserted into another machine to establish a credit balance for play.

Figure 3:
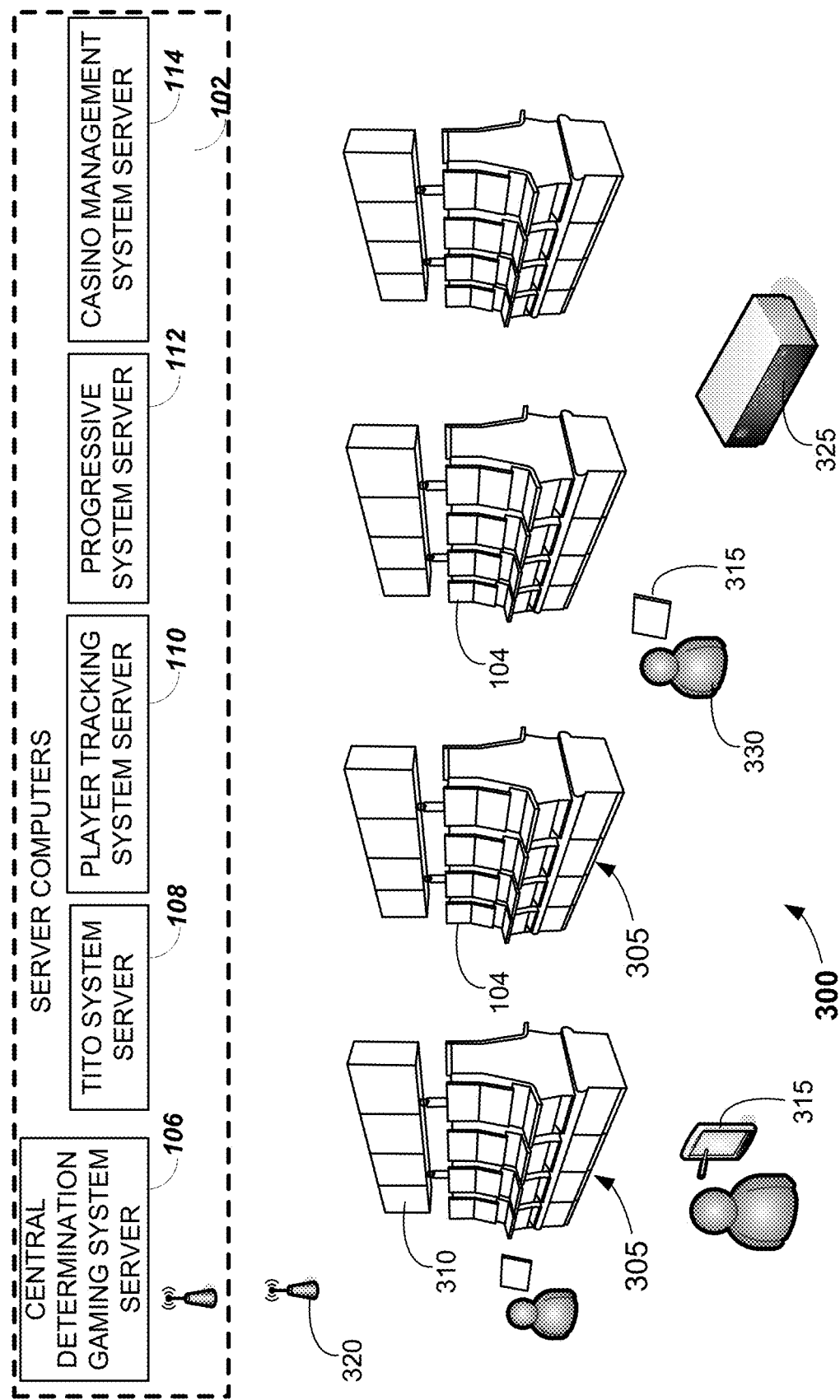
FIG. 3 depicts a casino gaming environment according to one example.

FIG. 3 depicts a casino gaming environment according to one example. In this example, the casino 300 includes banks 305 of EGMs 104. In this example, each bank 305 of EGMs 104 includes a corresponding gaming signage system 310. According to this implementation, the casino 300 also includes mobile gaming devices 315, which are also configured to present wagering games in this example. The mobile gaming devices 315 may, for example, include tablet devices, cellular phones, smart phones and/or other handheld devices. In this example, the mobile gaming devices 315 are configured for communication with one or more other devices in the casino 300, including but not limited to one or more of the server computers 102, via wireless access points 320.

According to some examples, the mobile gaming devices 315 may be configured for stand-alone determination of game outcomes. However, in some alternative implementations the mobile gaming devices 315 may be configured to receive game outcomes from another device, such as the central determination gaming system server 106, one of the EGMs 104, etc.

Some mobile gaming devices 315 may be configured to accept monetary credits from a credit or debit card, via a wireless interface (e.g., via a wireless payment app), via tickets, via a patron casino account, etc. However, some mobile gaming devices 315 may not be configured to accept monetary credits via a credit or debit card. Some mobile gaming devices 315 may include a ticket reader and/or a ticket printer whereas some mobile gaming devices 315 may not, depending on the particular implementation.

In some implementations, the casino 300 may include one or more kiosks 325 that are configured to facilitate monetary transactions involving the mobile gaming devices 315, which may include cash out and/or cash in transactions. The kiosks 325 may be configured for wired and/or wireless communication with the mobile gaming devices 315. The kiosks 325 may be configured to accept monetary credits from casino patrons 330 and/or to dispense monetary credits to casino patrons 330 via cash, a credit or debit card, via a wireless interface (e.g., via a wireless payment app), via tickets, etc. According to some examples, the kiosks 325 may be configured to accept monetary credits from a casino patron and to provide a corresponding amount of monetary credits to a mobile gaming device 315 for wagering purposes, e.g., via a wireless link such as a near-field communications link. In some such examples, when a casino patron 330 is ready to cash out, the casino patron 330 may select a cash out option provided by a mobile gaming device 315, which may include a real button or a virtual button (e.g., a button provided via a graphical user interface) in some instances. In some such examples, the mobile gaming device 315 may send a "cash out" signal to a kiosk 325 via a wireless link in response to receiving a "cash out" indication from a casino patron. The kiosk 325 may provide monetary credits to the patron 330 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 315 and/or a kiosk 325.

Some mobile gaming devices 315 may be configured for receiving and/or transmitting player loyalty information. For example, some mobile gaming devices 315 may be configured for wireless communication with the player tracking system server 110. Some mobile gaming devices 315 may be configured for receiving and/or transmitting player loyalty information via wireless communication with a patron's player loyalty card, a patron's smartphone, etc.

According to some implementations, a mobile gaming device 315 may be configured to provide safeguards that prevent the mobile gaming device 315 from being used by an unauthorized person. For example, some mobile gaming devices 315 may include one or more biometric sensors and may be configured to receive input via the biometric sensor(s) to verify the identity of an authorized patron. Some mobile gaming devices 315 may be configured to function only within a predetermined or configurable area, such as a casino gaming area.

Figure 4:
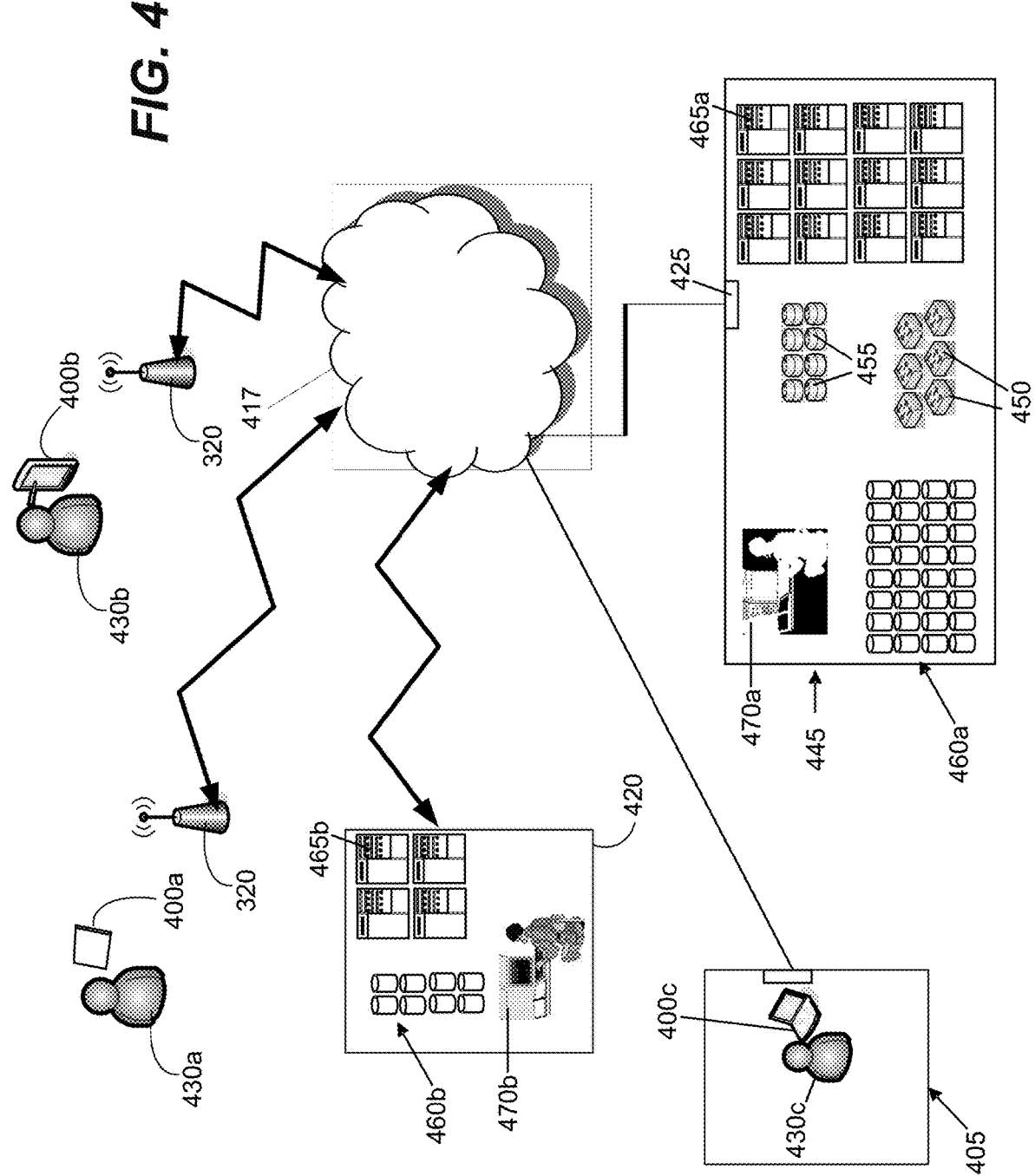
FIG. 4 is a diagram that shows examples of components of a system for providing online gaming according to some aspects of the present disclosure.

FIG. 4 is a diagram that shows examples of components of a system for providing online gaming according to some aspects of the present disclosure. As with other figures presented in this disclosure, the numbers, types and arrangements of gaming devices shown in FIG. 4 are merely shown by way of example. In this example, various gaming devices, including but not limited to end user devices (EUDs) 400a, 400b and 400c are capable of communication via one or more networks 417. The networks 417 may, for example, include one or more cellular telephone networks, the Internet, etc. In this example, the EUDs 400a and 400b are mobile devices: according to this example the EUD 400a is a tablet device and the EUD 400b is a smart phone. In this implementation, the EUD 400c is a laptop computer that is located within a residence 405 at the time depicted in FIG. 4. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 445 includes various devices that are configured to provide online wagering games via the networks 417. The gaming data center 445 is capable of communication with the networks 417 via the gateway 425. In this example, switches 450 and routers 455 are configured to provide network connectivity for devices of the gaming data center 445, including storage devices 460*a*, servers 465*a* and one or more workstations 570*a*. The servers 465*a* may, for example, be configured to provide access to a library of games for online game play. In some examples, code for executing at least some of the games may initially be stored on one or more of the storage devices 460*a*. The code may be subsequently loaded onto a server 465*a* after selection by a player via an EUD and communication of that selection from the EUD via the networks 417. The server 465*a* onto which code for the selected game has been loaded may provide the game according to selections made by a player and indicated via the player's EUD. In other examples, code for executing at least some of the games may initially be stored on one or more of the servers 465*a*. Although only one gaming data center 445 is shown in FIG. 4, some implementations may include multiple gaming data centers 445.

In this example, a financial institution data center 420 is also configured for communication via the networks 417. Here, the financial institution data center 420 includes servers 465*b*, storage devices 460*b*, and one or more workstations 470*b*. According to this example, the financial institution data center 420 is configured to maintain financial accounts, such as checking accounts, savings accounts, loan accounts, etc. In some implementations one or more of the authorized users 430*a*-430*c* may maintain at least one financial account with the financial institution that is serviced via the financial institution data center 420.

According to some implementations, the gaming data center 445 may be configured to provide online wagering games in which money may be won or lost. According to some such implementations, one or more of the servers 465*a* may be configured to monitor player credit balances, which may be expressed in game credits, in currency units, or in any other appropriate manner. In some implementations, the server(s) 465*a* may be configured to obtain financial credits from and/or provide financial credits to one or more financial institutions, according to a player's "cash in" selections, wagering game results and a player's "cash out" instructions. According to some such implementations, the server(s) 465*a* may be configured to electronically credit or debit the account of a player that is maintained by a financial institution, e.g., an account that is maintained via the financial institution data center 420. The server(s) 465*a* may, in some examples, be configured to maintain an audit record of such transactions.

In some alternative implementations, the gaming data center 445 may be configured to provide online wagering games for which credits may not be exchanged for cash or the equivalent. In some such examples, players may purchase game credits for online game play, but may not "cash out" for monetary credit after a gaming session. Moreover, although the financial institution data center 420 and the gaming data center 445 include their own servers and storage devices in this example, in some examples the financial institution data center 420 and/or the gaming data center 445 may use offsite "cloud-based" servers and/or storage devices. In some alternative examples, the financial institution data center 420 and/or the gaming data center 445 may rely entirely on cloud-based servers.

One or more types of devices in the gaming data center 445 (or elsewhere) may be capable of executing middleware, e.g., for data management and/or device communication. Authentication information, player tracking information, etc., including but not limited to information obtained by EUDs 400 and/or other information regarding authorized users of EUDs 400 (including but not limited to the authorized users 430*a*-430*c*), may be stored on storage devices 460 and/or servers 465. Other game-related information and/or software, such as information and/or software relating to leaderboards, players currently playing a game, game themes, game-related promotions, game competitions, etc., also may be stored on storage devices 460 and/or servers 465. In some implementations, some such game-related software may be available as "apps" and may be downloadable (e.g., from the gaming data center 445) by authorized users.

In some examples, authorized users and/or entities (such as representatives of gaming regulatory authorities) may obtain gaming-related information via the gaming data center 445. One or more other devices (such EUDs 400 or devices of the gaming data center 445) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Particularly in the context of wager-based gaming, it is important to make a record of each gambling game. As used herein, the term "game history" may be used to refer to such a record. A data structure that includes the game history may be referred to herein as a game history data structure. Making and maintaining a game history data structure may, in some instances, be required by regulatory authorities. For example, some regulatory authorities require the game history for a VLT to be maintained in order to verify that free games are metered independently of the base game, such that the VLT does not accumulate any free game wins with a base game win, which might potentially exceed the regulatory maximum win per game.

A game history data structure also may be useful in the context of player disputes. For example, if a player disputes some aspect of the game results, a casino attendant may access the game history data structure in order to replay a game and verify the results. Prior methods of creating and accessing game history data structures known to the present inventors have required a replay of an entire game round, including the base game and any intervening feature games, in order to replay a disputed feature game such as a disputed free game.

Particular aspects of the subject matter described in this disclosure can be implemented to realize one or more of the following potential advantages. In some implementations, an individual free game may be replayed without replaying the base game or any intervening free games. Some disclosed methods may involve receiving user input corresponding to a request for replay of the gambling game that includes a game round indication pertaining to an individual free game from within a feature game comprising a plurality of free games. The method may involve querying a game history data structure and retrieving game round metadata corresponding to the individual free game. The method may involve controlling a display to provide a sequence of images corresponding to the game round metadata. The sequence of images may correspond to a replay of the individual free game.

Figure 5:
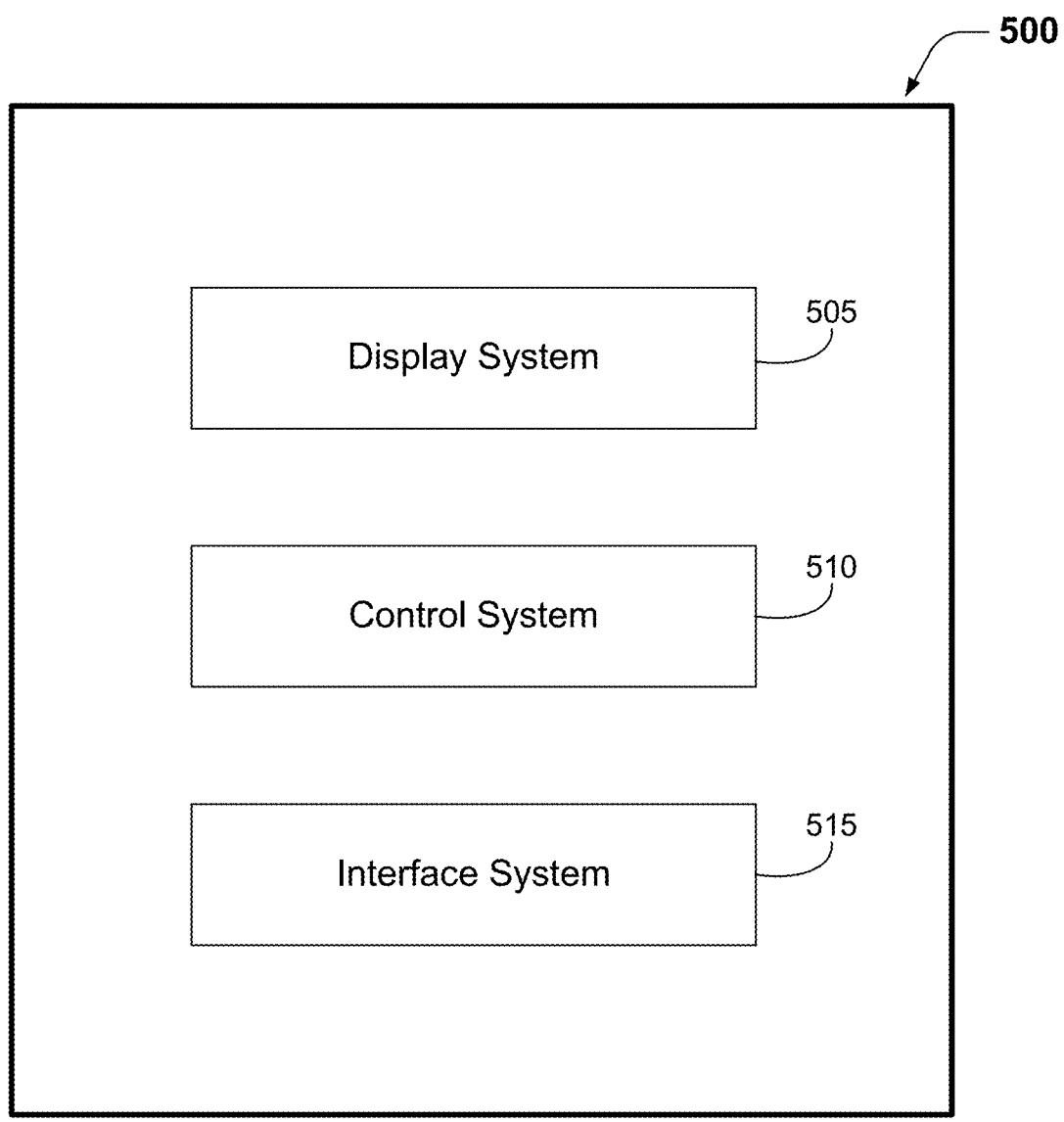
FIG. 5 is a block diagram that shows blocks of an apparatus according to one example.

FIG. 5 is a block diagram that shows blocks of an apparatus according to one example. According to some examples, the apparatus 500 may be, or may include, a gaming device. In some examples, the apparatus 500 may be an EGM such as those described above with reference to FIGS. 1 and 2. However, in alternative examples, the apparatus 500 may be a mobile device such as described above with reference to FIG. 3 or an EUD as described above with reference to FIG. 4.

In this example, the apparatus 500 includes a display system 505 and a control system 510 that is configured to communicate with the display system 505. In this example, the control system 510 is configured to communicate with the display system 505 via wired communication, e.g., via electrical signals. In alternative implementations, the control system 510 may be configured to communicate with the display system 505 via wireless communication. Accordingly, at least a portion of the control system 510 may be coupled to the display system 505. As used herein, the term "coupled to" has a meaning that could include being physically coupled for wired communication or being configured for wireless communication.

The control system 510 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. Although the interface system 515 is shown as being separate from the control system 510, in some implementations the interface system 515 may be part of the control system 510. In some implementations, the interface system 515 may include the entire control system 510. The control system 510 also may include (and/or be configured for communication with) one or more memory devices, such as one or more random access memory (RAM) devices, read-only memory (ROM) devices and/or other types of non-transitory media. In some implementations, at least a portion of the control system 510 may be implemented as a register. Accordingly, the apparatus 500 may have a memory system that includes one or more memory devices, though the memory system is not shown in FIG. 5.

The control system 510 may be capable of performing, at least in part, the methods disclosed herein. In some examples, the control system 510 may be capable of performing at least some of the methods described herein according to instructions (e.g., software) stored on non-transitory media. For example, the control system 510 may be configured for controlling the display system 505 and/or for receiving and processing data from at least a portion of the display system 505, e.g., as described below.

The display system 505 may include, one or more liquid crystal displays (LCDs), plasma displays, light-emitting diode (LED) displays, microLED displays or organic light-emitting diode (OLED) displays. According to some implementations, the display system 505 may include at least one flexible display, such as a flexible OLED. Although shown as separate components in FIG. 5, the display system 505 may, in some examples, include at least a portion of the control system 510. For example, the display system 505 may include one or more processors, microprocessors, programmable logic devices, discrete gates or transistor logic, etc.

In the example shown in FIG. 5, the apparatus 500 includes an interface system 515. In some examples, the interface system may include a wireless interface system. In some implementations, the interface system 515 may include a network interface, an interface between the control system 510 and the display system 505, an interface between the control system 510 and a memory system and/or an interface between the control system 510 and an external device interface (e.g., a port or an applications processor). In some examples, the interface system 515 may include one or more user interfaces, such as a touch screen, one or more buttons, a gesture recognition system, a voice recognition system, etc.

According to some implementations, the apparatus 500 may be a single device, whereas in other implementations the apparatus 500 may be a system that includes more than one device. Accordingly, the terms "apparatus" and "system" may sometimes be used interchangeably herein. In other examples, the apparatus 500 may be a component of another device. For example, in some implementations at least a portion of the display system 505 and/or the control system 510 may be included in more than one apparatus. For example, in some implementations at least part of the control system 510 may reside in a server, such as a central determination server, a server that tracks feature award credits, etc. Some implementations of the apparatus 500 may not include a display system. In some such implementations, the control system 510 may be configured for controlling the display system of another device.

Figure 6:
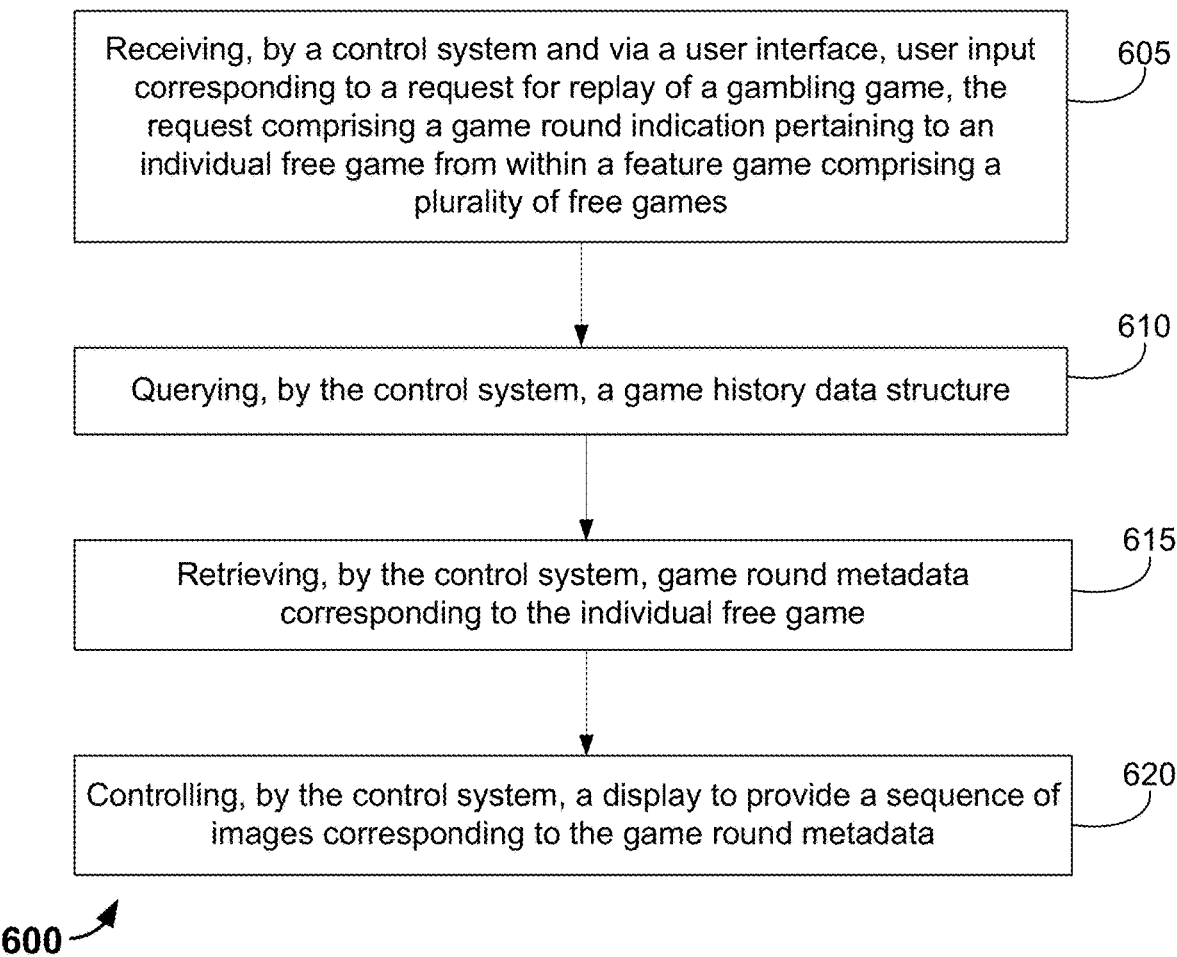
FIG. 6 is a flow diagram that shows blocks of a method according to one example.

FIG. 6 is a flow diagram that shows blocks of a method according to one example. In some examples method 600 may be performed, at least in part, by an apparatus such as that described above with reference to FIG. 5. In some examples, the method 600 may be performed by a control system (e.g., the control system 510 of FIG. 5) according to software stored upon one or more non-transitory storage media. As with other methods described herein, the number and sequence of blocks shown in FIG. 6 are merely examples. Similar disclosed methods may include more or fewer blocks. Moreover, at least some of the blocks may occur in a different sequence than the sequence that is shown in a flow diagram.

According to this example, block 605 involves receiving user input corresponding to a request for replay of a gambling game. In this example, the request includes a game round indication pertaining to an individual free game from within a feature game comprising a plurality of free games. According to this implementation, the user input is received by a control system, via a user interface. For example, the user input may be received by the control system 510 of FIG. 5, via a user interface of the interface system 515.

In some examples, the game round indication may include a base game indication and a feature game indication. The feature game indication may, for example, be a free game indication, a bonus game indication, etc.

In this example, block 610 involves querying, by the control system, a game history data structure. In some examples, block 610 may involve querying a local game history data structure that is stored on a memory device of the same apparatus that includes the control system. According to some such examples, block 610 may involve querying a memory device of the control system. However, in other implementations block 610 may involve querying a game history data structure that is stored on a memory device of a different apparatus. In some such implementations, block 610 may involve querying a memory device of a gaming data center, which in some examples may be similar to the gaming data center 445 that is described above with reference to FIG. 4.

Some examples of game history data structures are provided herein and described below. In some examples, the game history data structure includes game round metadata and game round index markers. According to some implementations, the game round index markers may include free game index markers for individual free games of the plurality of free games. The game round metadata may, for example, correspond with RNG values, user input (which may include but is not limited to button presses, credits received, wagers, etc.), intermediate game results, final game results and potentially other events that were recorded during a game round.

According to this example, the querying process of block 610 is based upon the request that is received in block 605. For example, querying the game history data structure may involve searching for a free game index marker corresponding to the individual free game indicated in the request. Some implementations of the method 600 may involve retrieving a game history data structure from a memory and making a copy of the game history data structure. According to some such implementations, the querying process of block 610 may involve querying the copy of the game history data structure.

In the example shown in FIG. 6, block 615 involves retrieving, by the control system, game round metadata corresponding to the individual free game of the request received in block 605. For example, block 615 may involve retrieving the game round metadata from the game history data structure, or from a copy of the game history data structure.

According to this example, block 620 involves controlling a display to provide a sequence of images corresponding to the game round metadata. For example, block 620 may involve controlling a display to present a sequence of images that corresponds to a replay of at least a portion of the individual free game of the request received in block 605.

According to some implementations, block 620 may involve a control system of an apparatus controlling a display of the same apparatus to present a sequence of images that corresponds to a replay of at least a portion of a game. In some such implementations, block 620 may involve a control system of a gaming device, such as an EGM, controlling a display of the same gaming device to present a sequence of images that corresponds to a replay of at least a portion of the game.

In other such implementations, block 620 may involve a control system of an EUD, such as a portable EUD (e.g., a tablet, a phablet, a laptop, etc.), controlling a display of the same EUD to present a sequence of images that corresponds to a replay of at least a portion of a game. The EUD may, for example, be an EUD that is used by a casino employee. The casino employee may be responsible for resolving casino patron disputes.

However, in other implementations block 620 may involve a control system of an apparatus controlling a display of a different apparatus to present a sequence of images that corresponds to a replay of at least a portion of a game. According to some such implementations, a control system of an EUD may control a display of a gaming device to present a sequence of images that corresponds to a replay of at least a portion of the game. The control system of the EUD may communicate with the gaming device via a wired or a wireless interface.

In some implementations, method 600 may involve finding a free game index marker corresponding to the individual free game and setting a render property corresponding to the individual free game to "true." For example, the querying process of block 610 may involve finding the free game index marker in the game history data structure, or from a copy of the game history data structure, and setting the render property corresponding to the individual free game to "true." In some examples, method 600 may involve finding the free game index marker in a copy of the game history data structure and deleting portions of the game history data structure corresponding to times subsequent to the individual free game.

In some implementations, method 600 may involve not finding a free game index marker corresponding to the individual free game of the request received in block 605. According to some such implementations, the last free game of the game history data structure may not have a corresponding free game index marker. In such instances, if the request received in block 605 is for the last free game of the game history data structure, no free game index marker corresponding to the individual free game of the request will be found. According to some such instances, method 600 may involve adding a free game index marker to the game history data structure corresponding to the individual free game. Such examples may involve setting a render property corresponding to the individual free game to "true."

In some implementations, method 600 may involve fast forwarding through the game history data structure to a point at which the next free game index marker has a render property set to true and stopping the fast forwarding process at that point. In some examples, the fast forwarding process may be part of block 615. Method 600 may involve enabling rendering to the display and replaying the individual free game at a normal game speed. The "normal game speed" may be the speed at which the individual free game was presented to a player during the game round corresponding to the game history data structure. In some examples, the process of replaying the individual free game may be part of block 620.

FIG. 7 shows an example of a graphical user interface (GUI) that may be used to access game history. The GUI 700 may, for example, be displayed on a display of the display system 505 of the apparatus 500 that is shown in FIG. 5. In some examples, the apparatus 500 may be a gaming device, such as a VLT or another type of electronic gaming machine. In alternative examples, the GUI 700 may be displayed on a display of an EUD, such as one of the types of EUDs that are described above with reference to FIG. 4.

The GUI 700 may, for example, be controlled by a control system (such as the control system 510) according to user input. In this example, the user input may be received via a sensor system, such as a touch sensor system and/or gesture sensor system, which overlies or underlies the display on which the GUI 700 is presented.

According to this example, the GUI 700 is one of many GUIs that may be presented by interacting with the operator menu 705. In this example, after receiving an indication of a touch in the game history area 710 of the operator menu 705 (e.g., a touch from a casino worker who is responsible for managing customer disputes), the control system controls the display to present the game history menu 715.

In this implementation, the game history menu 715 includes various navigation buttons 720 with which a user may interact in order to scroll through the game history. According to this example, the game history menu 715 is displaying multiple rows. Each row corresponds to a different time. The earliest event, which is a "bill in" event, is shown at the bottom. The time sequence of games or events proceeds from bottom to top.

According to this example, each row above the "bill in" event corresponds to a game. In some implementations, each game has a corresponding data block or "trace" in a game history data structure.

In this example, the number in the "#" column indicates a game round. Game rounds 1 and 2 only include a base game, which may be determined by either of the following indications: (1) there is only a single game in each game round and (2) each game round required a wager.

However, in this example game round 3 includes a base game (NO. 3/11) and at least 8 feature games (NO. 4/11-NO. 11/11). In this example, the feature games are free games. According to this implementation, the GUI 700 allows the user to replay any of the game instances indicated in the game history menu 715 by selecting one of the rows corresponding to a game and then selecting the replay button 725. In this example, the GUI 700 is highlighting the third free game of game round 3. A user may, for example, have touched an area of the GUI 700 corresponding to the row corresponding to the third free game of game round 3.

Figure 8:
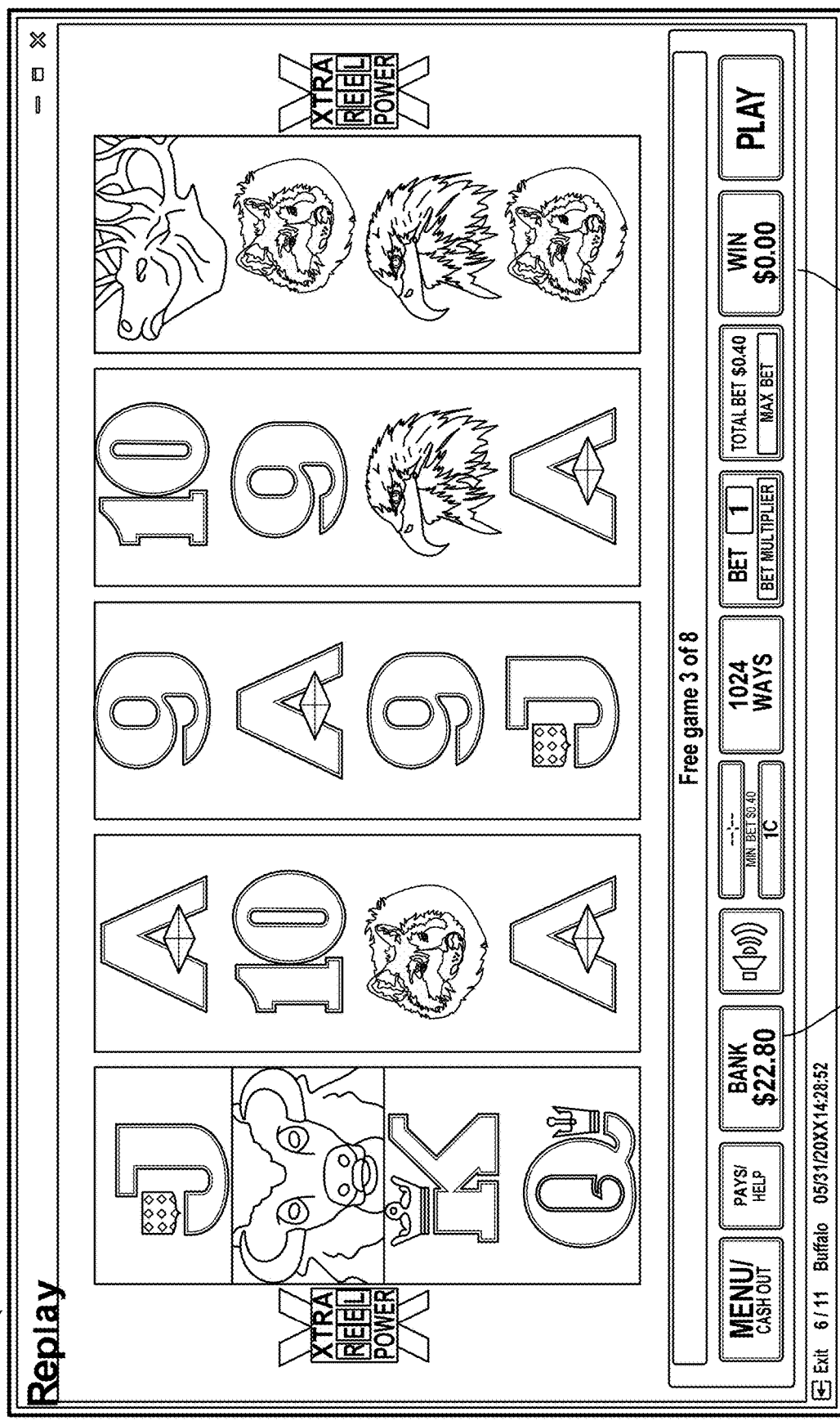
FIG. 8 shows an example of an image that may be displayed as part of a replay of a wagering game instance.

FIG. 8 shows an example of an image that may be displayed as part of a replay of a wagering game instance. In this example, the image 800 is being displayed on the same gaming device on which the original wagering game instance was presented, e.g., on the same VLT or other type of electronic gaming machine. In alternative examples, the image 800 may be displayed on a display of another gaming device. In some such examples, the image 800 may be displayed on an EUD, such as one of the types of EUDs that are described above with reference to FIG. 4. According to some examples, the GUI 700 may be displayed on an EUD and the image 800 may be displayed on a display of another device, e.g., on a VLT or another type of electronic gaming machine.

In this example, the image 800 corresponds to an instance of a Buffalo Stampede™ slot game provided by Aristocrat Technologies Australia Pty Limited. According to this example, the image 800 corresponds with the outcome of the third free game of game round 3 that is indicated in FIG. 7. The image 800 may, for example, have been presented after a user touched an area of the GUI 700 corresponding to the row indicating the third free game of game round 3 and then touched the replay button 725. A control system may have received the type of input referenced in block 605 and described above with reference to FIG. 6. In response, the control system may have performed the operations of blocks 610-620 of FIG. 6. The image 800 may, for example, correspond with the last image in the series of images that are presented in block 620 of FIG. 6.

By comparing the row corresponding with the third free game of game round 3 that is indicated in FIG. 7 with the image 800, one may note that both indicate a credit of $22.80 at the end of the game (compare the "End Cash" amount in FIG. 7 with the bank field 805 of FIG. 8). Moreover, both the GUI 700 and the image 800 indicate a win of $0.00 (compare the "Cash Won" amount in FIG. 7 with the win field 810 of FIG. 8).

FIG. 9 shows an example of a game history data structure. In this example, the game history data structure 900*a* includes base 64-encoded text. As such, it is difficult for a human to extract any useful information from the game history data structure 900*a*.

FIGS. 10A, 10B and 10C show an example of a decoded version of the game history data structure shown in FIG. 9. In this example, FIGS. 10A, 10B and 10C show a binary to hex/ASCII decode of the game history data structure shown in FIG. 9. After decoding, it is possible for a human to extract at least some useful information from the game history data structure 900*b*. For example, the ASCII data field 1005 of FIG. 10A indicates that the underlying game is a Buffalo Stampede™ slot game and that the game history data structure 900*b* was encoded by a software module named Trace Engine (TREngine). In this implementation, the hex data field 1010 includes game configuration information, including game language information, replay state information, bet information and reel stop information. The bet information and reel stop information, which correspond to a base game instance, are examples of game round metadata.

According to this example, row 000002D0 of the hex data field 1010 corresponds to a base game instance (see "BaseGameSpin" in the corresponding row of the ASCII data field 1005) and includes metadata corresponding to the base game, which may be used to replay the base game. This metadata continues in subsequent rows of the hex data field 1010.

In this example, the "FreeSpin0" text that begins in the row of the ASCII data field 1005 that corresponds to row 00000380 of the hex data field 1010 corresponds to the beginning of several free game instances, the text and metadata for which continue on FIGS. 10A and 10B. The corresponding rows of the hex data field 1010 include metadata corresponding to each of these individual free game instances, which may be used to replay each individual free game instance.

FIGS. 10A, 10B and 10C also show examples of free game index markers for these free game instances. According to these examples, free game index markers correspond with the hex string "B7 09 DB 84." These free game index markers are outlined in rectangles in FIGS. 10A, 10B and 10C. In this example, the hex string corresponding with the free game index markers was formed by applying a hash function to the text "RecoveryMarker."

In some implementations, software modules that may be referred to herein as the "platform" and the "game" run in different processes. The platform controls peripheral devices, storage and some aspects of presenting the game. In some such implementations there is a "host" software module for the game, which may be referred to as the "runtime." The runtime is a separate process that is responsible for bootstrapping the game. According to some implementations, there is an inter-game process communication (IPC) channel for communication between the platform and the game, so that data can be exchanged back and forth between the game and the platform. According to some such examples, the game creates the game history data structure and passes the game history data structure to the platform to be stored or "persisted."

According to some examples, the platform loads the game and sets either a normal or a replay state. In some such examples, during normal game play the Trace Engine software module is started and is set up to record what may be referred to herein as "traces" or "trace events." During a game round, trace events may be created and stored. These trace events may become the main components of the game history data structure.

According to some implementations, the game history data structure may include traces corresponding to the following events: MouseClickEvent; MouseMoveEvent; ButtonClickEvent; GameRoundEvent; GameRoundInvokeEvent; BalanceUpdateEvent; BetUpdateEvent; GameConfigValueChangeEvent; GameConfigAttributeChangeEvent; InitConfigValueEvent; PersistedDataBlobEvent; JackpotTriggerEvent; and RecoveryMarker.

In some such implementations, the game history data structure may be created using a structure such as the following:

[4 bytes]=game history data structure header
[4 bytes]=game history data structure version
[string]=engine name

[4 bytes]=hash(<EventName>)
[N bytes . . . ]=Event Data

Other implementations may use a different data structure, a different number of bytes, etc. The EventName may, for example, include one or more of the events listed in the preceding paragraph. One such event may be constructed as follows:

Event 1)
[4 bytes]=hash<MouseClickEvent>
[4 bytes]=x
[4 bytes]=y
[4 bytes]=ButtonId
[4 bytes]=ButtonState
[4 bytes]=DisplayId
[4 bytes]=HitType
[N bytes string]=TraceId Another such event may be constructed as follows:
Event 2)
[4 bytes]=hash<GameRoundEvent>

Another such event may be constructed as follows:
Event 3)
[4 bytes]=hash<RecoveryMarker>

Figure 11:
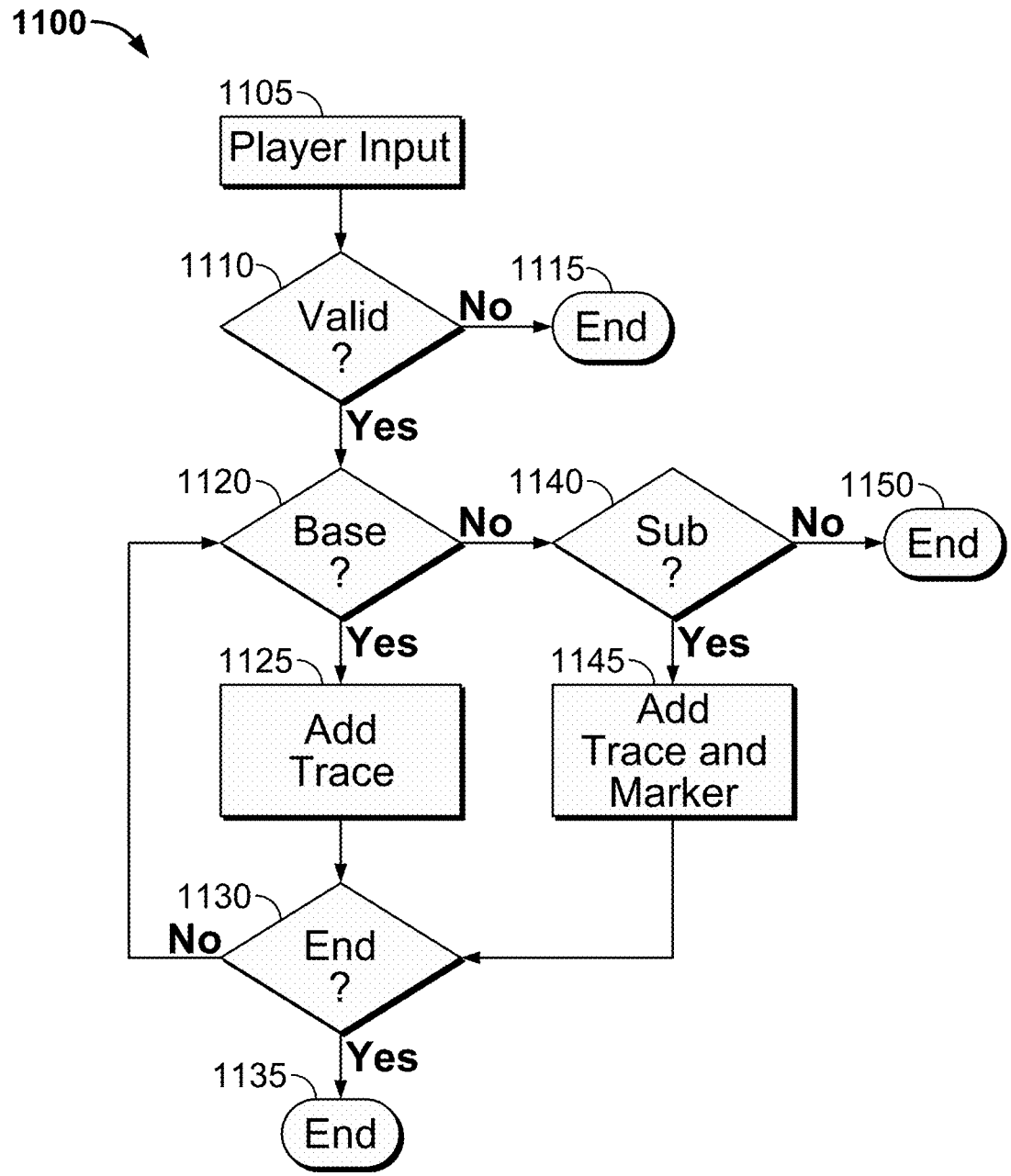
FIG. 11 is a flow diagram that shows blocks of a method according to another example.

FIG. 11 is a flow diagram that shows blocks of a method according to another example. In some examples method 1100 may be performed, at least in part, by an apparatus such as that described above with reference to FIG. 5. In some instances method 1100 may be performed, at least in part, by a gaming device, such as any of gaming devices 104A-104X of FIG. 1, gaming device 200 of FIG. 2, one of the mobile gaming devices 315 of FIG. 3 or one of the EUDs 400 of FIG. 4. In some examples, the method 1100 may be performed by a control system (e.g., the control system 510 of FIG. 5) according to software stored upon one or more non-transitory storage media. As with other methods described herein, the number and sequence of blocks shown in FIG. 11 are merely examples. Similar disclosed methods may include more or fewer blocks. Moreover, at least some of the blocks may occur in a different sequence than the sequence that is shown in a flow diagram.

According to this example, block 1105 involves receiving user input corresponding to a request for play of a gambling game. Block 1105 may, for example, involve the receipt of an indication that a "play" button has been pressed. In this example, block 1110 involves determining whether the request received in block 1105 was a valid request. Block 1110 may, for example, involve determining whether a credit balance is sufficient for play of one instance of a base game at an indicated wager level. If it is determined in block 1110 that the request is not valid, the process ends in block 1115 in this example. Block 1115 may involve controlling a gaming device to provide a prompt to remedy the underlying cause of the "not valid" determination.

However, if it is determined in block 1110 that the request is valid, the process continues to block 1120 in this example. In this implementation, block 1120 involves determining whether the game is a base game. If so, the base game is presented on the gaming device and a trace is added in block 1125. The trace may include sufficient base game data and metadata to make a record of the base game and to provide a replay of the base game, such as RNG data, starting credits, credits wagered, credits won, ending credits, slot symbol or other game outcome presentation data, etc.

According to this example, block 1130 involves determining whether game play will continue. Block 1130 may, for example, involve processes similar to those of block 1105 and 1110, but may also involve determining whether user input indicating a "cash out" or the like has been received. If it is determined in block 1130 that game play will not continue, the process continues to block 1135, in which game play ends. A game history data structure that includes traces for all games played may be stored.

However, if it is determined in block 1130 that game play will continue, the process reverts to 1120. If it is determined in block 1120 that the next game will be a base game, the base game is presented on the gaming device and a trace is added in block 1125. If it is determined in block 1120 that the next game will not be a base game, a "sub game" (which may be a feature game, such as a free game) is presented on the gaming device and a trace and a marker is added in block 1145. In some such examples, an event of type "Recovery-Marker" is created at the beginning of every sub game instance. According to some such implementations, the events stored by the trace engine are converted to a stream of bytes and forwarded to the platform for storage. After the sub game is presented, the process continues to block 1130 in this example. Method 1100 may continue until block 1115, block 1150 or block 1135 is reached.

According to some examples, during replay mode the platform may provide a stream of bytes that includes the game history data structure and a replay index as parameters to the game. In some instances, the stream of bytes may be converted to a collection of trace events. The trace engine may be started and set up to replay trace events.

The trace engine may be configured to search for a marker (e.g., an event of type Recovery-Marker) that matches the game round index that a user has selected to replay. According to some examples, the game round index 0 may be used for the base round, 1 may correspond to the first sub round, etc. Other examples may use other numbering schemes.

In some implementations, if a Recovery Marker is not found, one may be added to the end of the game history data structure. In some instances, all events after the Recovery Marker will be deleted.

The Recovery Marker may, in some instances, contain a "render state" field that may be used to signal that the game should render to a display. In some examples the Recovery Marker may contain a pause state field that may be used to indicate that the replay of the game should be paused.

According to some examples, events stored by the trace engine may be executed one by one, recreating the game round progress. In some such examples, at the start of an event the software module will look ahead and determine the next event type. If the next event type is a Recovery Marker, the pause and render states will be executed. This sequence of operations results in the game round being presented on screen. In other implementations, such as those described above, only an individual game instance, such as an individual free game instance, may be selected and replayed.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

The invention claimed is:

1. A gaming device, comprising:
 an interface system comprising a user interface;
 a display system comprising at least one display device;
 a memory system configured for storing a game history data structure; and
 a control system configured for:
  receiving, via the user interface, user input corresponding to a request for play of a gambling game;

determining whether the gambling game is a base game or a sub game; in response to determining that the gambling game is a base game:
   controlling the display system to provide a sequence of images corresponding to an instance of the base game;
   determining base game data and base game metadata corresponding to the instance of the base game; and
   adding a base game trace to the game history data structure corresponding to the base game data and the base game metadata;
in response to determining that the gambling game is a sub game:
   controlling the display system to provide a plurality of instances of the sub game wherein each instance of the sub game includes controlling the display to provide a sequence of images corresponding to the instance of the sub game;
   determining, for each instance of the sub game, sub game data and sub game metadata corresponding to each instance of the sub game;
   adding, for each instance of the sub game, a sub game trace to the game history data structure corresponding to the sub game data and the sub game metadata; and
   adding, for each instance of the sub game, a game round index marker to the game history data structure corresponding to each instance of the sub game, wherein both the sub game trace and the game round index marker together enable indexing to, retrieving, and displaying to a user a particular instance of the plurality of instances of the sub game.

2. The gaming device of claim 1, wherein the sub game comprises a feature game.

3. The gaming device of claim 2, wherein the feature game comprises a free game.

4. The gaming device of claim 1, wherein the control system is further configured for:
   receiving, via the user interface, user input corresponding to a request for replay of the particular instance of the plurality of instances of the sub game, the request comprising a game round indication pertaining to the particular instance of the plurality of instances of the sub game; and
   displaying, in response to receiving the request for replay of the particular instance of the plurality of instances of the sub game, the particular instance of the plurality of instances of the sub game.

5. The gaming device of claim 1, wherein:
   the sub game data and the sub game metadata include sufficient information to provide a replay of the instance of the sub game.

6. The gaming device of claim 1, wherein the base game metadata include one or more of RNG data, starting credits data, credits wagered data, credits won data, ending credits data, slot symbol data or other game outcome presentation data.

7. The gaming device of claim 1, wherein the game round index marker comprises a render state field indicating that a game instance should render to a display.

8. The gaming device of claim 1, wherein the sub game trace is the same as the base game trace.

9. One or more non-transitory media having software stored thereon, the software including instructions for controlling one or more devices to perform a method of recording gambling game events for replay, the method comprising:
   receiving, via a user interface, user input corresponding to a request for play of a gambling game;
   determining, via a control system comprising at least one processor, whether the gambling game is a base game or a sub game; in response to determining that the gambling game is a base game:
      controlling, via the control system, the display system to provide a sequence of images corresponding to an instance of the base game;
      determining, via the control system, base game data and base game metadata corresponding to the instance of the base game; and
      adding, via the control system, a base game trace to a game history data structure corresponding to the base game data and the base game metadata;
   in response to determining that the gambling game is a sub game:
      controlling, via the control system, the display system to provide a plurality of instances of the sub game wherein each instance of the sub game includes controlling the display system to provide a sequence of images corresponding to an instance of the sub game;
      determining, via the control system, for each instance of the sub game, sub game data and sub game metadata corresponding to each instance of the sub game;
      adding, via the control system, for each instance of the sub game, a sub game trace to the game history data structure corresponding to the sub game data and the sub game metadata; and
      adding, via the control system, for each instance of the sub game, a game round index marker to the game history data structure corresponding to each instance of the sub game, wherein both the sub game trace and the game round index marker together enable indexing to, retrieving, and displaying to a user a particular instance of the plurality of instances of the sub game.

10. The one or more non-transitory media of claim 9, wherein the sub game comprises a feature game.

11. The one or more non-transitory media of claim 10, wherein the feature game comprises a free game.

12. The one or more non-transitory media of claim 9, wherein the method further comprises:
   receiving, via the user interface, user input corresponding to a request for replay of the particular instance of the plurality of instances of the sub game, the request comprising a game round indication pertaining to the particular instance of the plurality of instances of the sub game; and
   displaying, in response to receiving the request for replay of the particular instance of the plurality of instances of the sub game, the particular instance of the plurality of instances of the sub game.

13. The one or more non-transitory media of claim 9, wherein:
   the sub game data and the sub game metadata include sufficient information to provide a replay of the instance of the sub game.

14. The one or more non-transitory media of claim 9, wherein the base game metadata include one or more of RNG data, starting credits data, credits wagered data, credits won data, ending credits data, slot symbol data or other game outcome presentation data.

15. The one or more non-transitory media of claim 9, wherein the game round index marker comprises a render state field indicating that a game instance should render to a display.

16. A method of recording gambling game events for replay, the method comprising:
receiving, via a user interface, user input corresponding to a request for play of a gambling game;
determining, via a control system comprising at least one processor, whether the gambling game is a base game or a sub game; in response to determining that the gambling game is a sub game:
controlling, via the control system, the display system to provide a plurality of instances of the sub game, wherein each instance of the sub game includes controlling the display system to provide a sequence of images corresponding to an instance of the sub game;
determining, via the control system, for each instance of the sub game, sub game data and sub game metadata corresponding to each instance of the sub game;
adding, via the control system, for each instance of the sub game, a sub game trace to the game history data structure corresponding to the sub game data and the sub game metadata; and
adding, via the control system, for each instance of the sub game, a game round index marker to each game history data structure corresponding to the instance of the sub game, wherein both the sub game trace and the game round index marker enable indexing to, retrieving, and displaying to a user a particular instance of the plurality of instances of the sub game.

17. The method of claim 16, wherein the sub game comprises a feature game.

18. The method of claim 17, wherein the feature game comprises a free game.

19. The method of claim 18, further comprising:
receiving, via the user interface, user input corresponding to a request for replay of the particular instance of the plurality of instances of the sub game, the request comprising a game round indication pertaining to the particular instance of the plurality of instances of the sub game; and
displaying, in response to receiving the request for replay of the particular instance of the plurality of instances of the sub game, the particular instance of the plurality of instances of the sub game.

20. The method of claim 16, wherein the sub game data and the sub game metadata include sufficient information to provide a replay of the instance of the sub game.

21. The method of claim 16, wherein the game round index marker comprises a render state field indicating that a game instance should render to a display.

* * * * *